US010247829B2

(12) United States Patent
Wu et al.

(10) Patent No.: US 10,247,829 B2
(45) Date of Patent: Apr. 2, 2019

(54) SYSTEMS AND METHODS FOR REAL TIME CARRIER PHASE MONITORING

(71) Applicant: Raytheon Company, Waltham, MA (US)

(72) Inventors: Shuwu Wu, Foothill Ranch, CA (US); Stephen R. Peck, West Hills, CA (US); Jason M. Burke, Placentia, CA (US); Tyler Thomas, Brea, CA (US); Joseph Chang, Orange, CA (US)

(73) Assignee: Raytheon Company, Waltham, MA (US)

( * ) Notice: Subject to any disclaimer, the term of this patent is extended or adjusted under 35 U.S.C. 154(b) by 288 days.

(21) Appl. No.: 15/233,270

(22) Filed: Aug. 10, 2016

(65) Prior Publication Data
US 2018/0045833 A1 Feb. 15, 2018

(51) Int. Cl.
*G01S 19/40* (2010.01)
*G01S 19/54* (2010.01)

(52) U.S. Cl.
CPC .............. *G01S 19/40* (2013.01); *G01S 19/54* (2013.01)

(58) Field of Classification Search
CPC .......... G01S 19/40; G01S 19/54; G01S 19/42; G01S 19/05; G01S 19/09; G01S 19/48
(Continued)

(56) References Cited

U.S. PATENT DOCUMENTS 5,543,804 A 8/1996 Buchler et al.
5,548,293 A 8/1996 Cohen
(Continued)

FOREIGN PATENT DOCUMENTS

KR 20020074267 A * 9/2002
KR 100376657 B1 * 3/2003

OTHER PUBLICATIONS

Giorgi, et al.; "Enhancing the Time-To-Fix for the Unaided Single-Frequency Integer Ambiguity Resolution in GNSS Attitude Determination Applications"; 2010 IEEE/ION Position Location and Navigation Symposium (plans); May 4-6, 2010; 10 Pages.
(Continued)

*Primary Examiner* — Harry K Liu
(74) *Attorney, Agent, or Firm* — Daly, Crowley, Mofford & Durkee, LLP

(57) ABSTRACT

The concepts, systems and methods described herein are directed towards real time carrier phase monitoring and platform attitude solutions on a moving platform. In an embodiment, highly accurate platform attitude and monitored carrier phases can be determined in a single step and use data screening, error bounds inflation and statistical tests to ensure both inputs and outputs of an attitude solution are self-consistent. The method includes determining a carrier phase error level for each of the satellite-receiver tracks, identifying the satellite-receiver tracks having the carrier phase error level greater than or equal to a carrier phase error threshold, generating an attitude correction using the received data from the one or more satellite-receiver tracks having the carrier phase error level less than the carrier phase error threshold and determining a convergence state of the attitude correction. The carrier phase monitoring may be activated or dis-activated based on the convergence level.

20 Claims, 6 Drawing Sheets

(58) Field of Classification Search
USPC .................................................. 342/357.23
See application file for complete search history.

(56) References Cited

U.S. PATENT DOCUMENTS

| | | | |
|---|---|---|---|
| 5,561,432 A | 10/1996 | Knight | |
| 5,933,110 A | 8/1999 | Tang et al. | |
| 6,061,631 A | 5/2000 | Zhang | |
| 6,088,653 A | 7/2000 | Sheikh et al. | |
| 6,441,779 B1* | 8/2002 | Bennett | G01S 5/0247 342/174 |
| 6,697,736 B2 | 2/2004 | Lin | |
| 6,753,810 B1 | 6/2004 | Yang et al. | |
| 6,792,380 B2 | 9/2004 | Toda | |
| 7,205,939 B2 | 4/2007 | Zimmerman | |
| 7,292,185 B2 | 11/2007 | Whitehead et al. | |
| 7,355,549 B2 | 4/2008 | Fukuda et al. | |
| 7,411,545 B2 | 8/2008 | Dutton | |
| 7,415,354 B2* | 8/2008 | Alexander | G01S 19/47 342/350 |
| 7,570,204 B1 | 8/2009 | McGraw | |
| 7,768,451 B2 | 8/2010 | Wu et al. | |
| 7,855,678 B2 | 12/2010 | Scherzinger et al. | |
| 7,868,820 B2 | 1/2011 | Kolb | |
| 7,987,049 B2 | 7/2011 | Hayashi et al. | |
| 9,173,337 B2 | 11/2015 | Guyette et al. | |
| 2003/0112177 A1 | 6/2003 | Toda et al. | |
| 2008/0129586 A1 | 6/2008 | Martin | |
| 2008/0297408 A1 | 12/2008 | Dai et al. | |
| 2011/0181463 A1 | 7/2011 | Chopard et al. | |
| 2012/0286991 A1* | 11/2012 | Chen | G01S 19/04 342/357.23 |
| 2013/0069822 A1 | 3/2013 | Wu et al. | |
| 2014/0197988 A1 | 7/2014 | Teunissen et al. | |
| 2017/0192103 A1* | 7/2017 | Kundak | G01S 19/05 |

OTHER PUBLICATIONS

Kalman; "A New Approach to Linear Filtering and Prediction Problems"; Transaction of the ASME—Journal of Basic Engineering, 82 (Series D); pp. 35-45; Mar. 1960; 12 pages.

McGraw; "Generalized Divergence-Free Carrier Smoothing with Applications to Dual Frequency Differential GPS"; Journal of the Institute of Navigation; vol. 56, No. 2; pp. 115-122; Summer 2009; 8 Pages.

Teunissen; "The Least-Squares Ambiguity Decorrelation Adjustment: A Method for Fast GPS Integer Ambiguity Estimation"; Journal of Geodesy; vol. 70; pp. 65-82; 1995; 18 pages.

Teunissen; "GNSS Ambiguity Bootstrapping: Theory and Application"; Delft University of Technology; Jan. 2001; 9 pages.

Teunissen et al.; "A Probabilistic Evaluation of Correct GPS Ambiguity Resolution"; Delft University of Technology; Jan. 1998; 9 pages.

Wang, et al.; "A Motion-based integer ambiguity resolution method for attitude determination using the global positioning system (GPS)"; Measurement Science and Technology; Apr. 28, 2010; 9 pages.

Wu, et al.; "Geometry Extra-Redundant Almost Fixed Solutions: A High Integrity Approach for Carrier Phase Ambiguity Resolution for High Accuracy Relative Navigation"; 2008 IEEE/ION Position, Location and Navigation Symposium; May 5-8 2008; 16 pages.

Wu et al.; "Differential GPS Based-Ultra Accuracy Real Time Attitude Determination"; Raytheon Company; 2010; 11 pages.

* cited by examiner

SYSTEMS AND METHODS FOR REAL TIME CARRIER PHASE MONITORING

GOVERNMENT INTERESTS

This invention was made with the government support under Contract No. N00019-08-C-0034 awarded by the U.S. Navy. The government has certain rights in this invention.

BACKGROUND

As is known in the art, certain applications require very accurate positional location information and may use systems such as the US global positioning systems (GPS) or other global navigation satellite system (GNSS). However, the use of the GNSS for high accuracy, high-integrity, safety-critical, high-availability missions can be challenging due to strenuous environments that contain fixed and moving blockages with GNSS receivers mounted on a moving and flexing platform. For example, carrier phase and attitude measurements on a moving platform may not be accurate from one-time period to the next as the structure holding the receivers flexes under physical stress, and the relative distances between the receivers change. Further, the environment may be constantly changing, creating dynamic blockages, which can cause distortions in a carrier phase signal, leading to inaccurate range measurements.

Carrier phase measurements in particular are known to be susceptible to a wide range of errors. These errors include atmospheric, radio frequency interference (RFI), multipath, survey and receiver tracking issues. On a moving platform additional errors may arise, such as, platform flexure and attitude translation errors. In addition, lever arm translation error is introduced when comparing or combining carrier phase measurements among different sensors on the moving platform. These sources of dynamic error may cause sudden jumps of positioning error that may not be acceptable in high-accuracy, high-integrity, safety-critical applications.

SUMMARY

The concepts, systems and methods described herein are directed towards real time carrier phase monitoring on a moving platform. In an embodiment, highly accurate platform attitude and monitored carrier phases can be determined in a single step and use data screening, error bounds inflation and statistical tests to ensure both inputs and outputs of an attitude solution are self-consistent.

The use of the global navigation satellite system (GNSS) for high accuracy, high-integrity, safety-critical, high-availability missions can be challenging due to strenuous environments that contain fixed and moving blockages with GNSS receivers mounted on a moving flexing platform. In some embodiments, to correct for errors in the GNSS measurements, such as from a single receiver, measurements from multiple receivers may be used, as well as prior knowledge based on surveyed data at the each of the receivers may be used to increase the positioning accuracy of GNSS solutions and provide additional capability to offer a measure of integrity for safety-critical applications. For example, on a moving platform, it is critical to have very accurate estimates of the platform's roll, pitch and yaw angles, in order to compare or combine phase measurements across multiple receivers for monitoring purposes. On the other hand, to determine platform attitude accurately with high integrity requires properly monitored carrier phase measurements. Thus, a cyclically dependency is created between carrier phase monitoring and high integrity attitude determination (e.g., a "chicken-and-egg" problem). The methods and systems described herein solves this "chicken-and-egg" problem, and thus, enabling high integrity GNSS applications on a moving platform.

For example, carrier phases from one or more satellite-receiver tracks can be monitored using double differencing across multiple receivers, while at the same time monitoring the platform attitude solution in order to screen out satellite-receiver tracks that have faulty carrier phase measurements. The faulty measurements may be caused by the moving platform, as well as other error sources such as blockage, multipath, or receiver tracking issues. Thus, by screening out these carrier phase measurements as inputs for a real time attitude solution (i.e., RTAD), the platform attitude accuracy and overall positioning accuracy can be increased. In an embodiment, the high integrity can be achieved by testing for convergence to ensure inputs and outcome of real time attitude determination (RTAD) are consistent with one another and remain consistent over a specified time period. Thus, highly accurate platform attitude solutions and monitoring of carrier phases can be determined in a single step while avoiding cyclical dependency.

In an embodiment, methods may include screening out carrier phase measurement outliers before a next GNSS attitude solution (i.e., pre-screening). A real time attitude determination (RTAD) may be performed on accepted carrier phase measurements and statistical tests may be used to determine attitude convergence states. In some embodiments, carrier phase monitoring may be enabled or disabled responsive to a convergence state of the RTAD measurements. For example, in one embodiment, the carrier phase monitoring may be enabled responsive to determining the RTAD measurements have reached a convergence threshold. Alternatively, in other embodiments, the carrier phase monitoring may be disabled responsive to determining the RTAD measurements have fallen below a convergence threshold. Further, carrier phase measurement outliers may be screened out after the GNSS attitude solution (i.e., post-screening). Finally, double difference residuals generated for satellite-receiver tracks may be decomposed using a least squares fit, for example, to determine carrier phase error over-bounds.

In one aspect, a method for performing carrier phase monitoring is provided. The method includes receiving data from a plurality of receivers. The data may correspond to one or more satellite-receiver tracks. The method further includes continually generating an iterative attitude correction based on the received data and determining a convergence test statistic of the attitude correction. The method further includes determining a convergence level of the attitude correction using the convergence test statistic and responsive to the determination, monitoring a carrier phase error of signals received from the one or more satellite-receiver tracks. The convergence level can be used to determine the appropriate level of monitoring the carrier phase error. As the system attains a higher level of convergence, the carrier phase errors can be monitored more precisely, maintaining the robustness of the system.

Monitoring the carrier phase error may include determining the satellite-receiver tracks having a carrier phase error greater than or equal to a carrier phase error threshold and determining a second attitude correction using the one or more satellite-receiver tracks having the carrier phase error less than the carrier phase error threshold.

In some embodiments, the method includes generating the double difference measurements and the carrier phase measurements for the one or more satellite-receiver tracks. Half cycle tracks may be identified in the one or more satellite-receiver tracks using the double difference measurements and the identified half cycle tracks may be filtered out (removed) from the one or more satellite-receiver tracks. The method may include decomposing the double difference measurements to identify the satellite-receiver tracks with the carrier phase error greater than or equal to the carrier phase error threshold by performing a least squares fit determination to decompose the double difference measurements.

In some embodiments, the method includes transmitting the received data from one or more satellite-receiver tracks having the carrier phase error less than the carrier phase error threshold to an RTAD module. A real-time attitude determination (RTAD) may be performed on the received data from the one or more satellite-receiver tracks.

In some embodiments, the method includes determining a first convergence state of the attitude correction and determining a second convergence state of the attitude correction. In an embodiment, enabling carrier phase monitoring may be enabled responsive to determining that the convergence test statistic of the attitude correction is greater than or equal to the second convergence level threshold, wherein the second convergence state is enabled. The second convergence state may have a more stringent criteria than the first convergence state, which for example can ensure consistent attitude corrections over time rather than just instantaneously. In some embodiments, where the plurality of receivers are on a moving platform, the method may include determining a platform attitude for the moving platform based on the second attitude correction and the received data from the one or more satellite-receiver tracks having the carrier phase error less than the carrier phase error threshold.

In another aspect, a method for performing carrier phase monitoring is provided. The method includes receiving data from a plurality of receivers. The data may correspond to one or more satellite-receiver tracks. The method includes determining a carrier phase error level for each of the satellite-receiver tracks, identifying the satellite-receiver tracks having the carrier phase error level greater than or equal to a carrier phase error threshold, generating an attitude correction for the platform using the received data from the one or more satellite-receiver tracks having the carrier phase error level less than the carrier phase error threshold, determining a convergence state of the attitude correction and updating error bounds for the one or more satellite-receiver data tracks based on attitude observable residuals.

In some embodiments, the method includes generating double difference measurements and carrier phase measurements for the one or more satellite-receiver tracks. An attitude correction is computed using the double difference measurements and the carrier phase measurements corresponding the one or more satellite-receiver tracks having the carrier phase error less than the carrier phase error threshold. In some embodiments, half cycle tracks may be identified in the one or more satellite-receiver tracks using the double difference measurements and the identified half cycle tracks may be filtered out from the one or more satellite-receiver tracks.

In some embodiments, the method includes decomposing the double difference measurements to identify the satellite-receiver tracks with the carrier phase error greater than or equal to the carrier phase error threshold by performing a least squares fit determination to decompose the double difference measurements. The method may include performing real-time attitude determination (RTAD) on the received data from the one or more satellite-receiver tracks.

In some embodiments, the method includes determining a first convergence state of the attitude correction and determining a second convergence state of the attitude correction. In an embodiment, carrier phase monitoring may be enabled responsive to determining that the attitude correction is greater than or equal to the second convergence state.

In some embodiments, where the plurality of receivers are on a moving platform, the method includes determining a platform attitude for the moving platform based on the attitude correction and the received data from the one or more satellite-receiver tracks having the carrier phase error less than the carrier phase error threshold.

In another aspect, a method for performing carrier phase monitoring is provided. The method includes receiving data from a plurality of receivers on a moving platform. The data may correspond to one or more satellite-receiver tracks, each of the one or more satellite-receiver tracks having an error bound obtained over a period of time or at initialization. The method further includes generating an attitude correction based on attitude observables formed by the received data and attitude observable error bounds corresponding to error bounds for the one or more satellite-receiver tracks, calculating attitude observables residuals using the attitude correction, testing a consistency between the error bounds for the one or more satellite-receiver tracks and the attitude observables residuals and responsive to the testing, updating the error bounds for the one or more satellite-receiver data tracks based on the attitude observable residuals.

BRIEF DESCRIPTION OF THE DRAWINGS

The foregoing features may be more fully understood from the following description of the drawings in which.

DETAILED DESCRIPTION

Global Positioning System (GPS) is a US global navigation satellite system (GNSS). Thus, it should be appreciated that although many embodiments described herein may discuss GPS applications, the system and methods described herein are equally applicable to GNSS systems.

Figure 1:
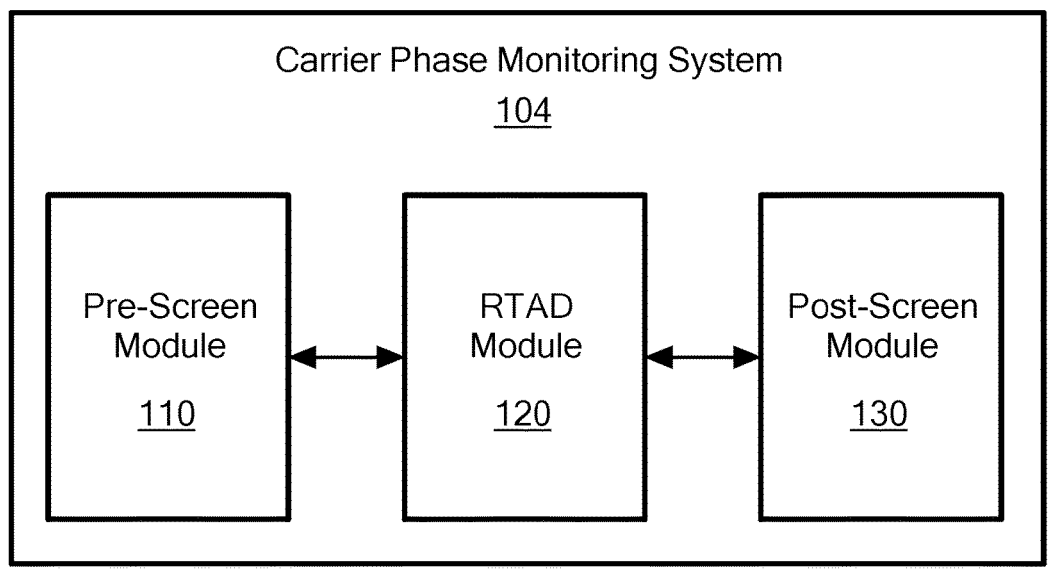
FIG. 1 is a block diagram of a carrier phase monitoring system.

Now referring to FIG. 1, a carrier phase monitoring system 104 includes a pre-screen module 110, a real time attitude determination (RTAD) module 120 and a post-screen module 130. In an embodiment, the carrier phase monitoring may include modules to perform different phases of screening and filtering of carrier phase data in order to identify satellite-receiver tracks having data outside an acceptable range before these satellite-receiver tracks are used in attitude correction measurements.

In an embodiment, a first module, or pre-screen module 110, may perform pre-screening of outlier satellite-receiver tracks before they can be used in an attitude determination.

A second module, or RTAD module 120, may determine a convergence level of an attitude solution. A third module, or post-screen module 130, may perform post-screening of satellite-receiver tracks used in the first and/or second modules. In some embodiments, the third module may generate attitude-corrected double difference residuals and pass them to a sigma monitor so that scaling factors applied to the noise uncertainty for the satellite-receiver tracks having errors above a predetermined threshold can be used for the next iteration of carrier phase monitoring. In some embodiments, the carrier phase monitoring system 104 may be used to perform real-time carrier phase monitoring on a moving platform.

Figure 2:
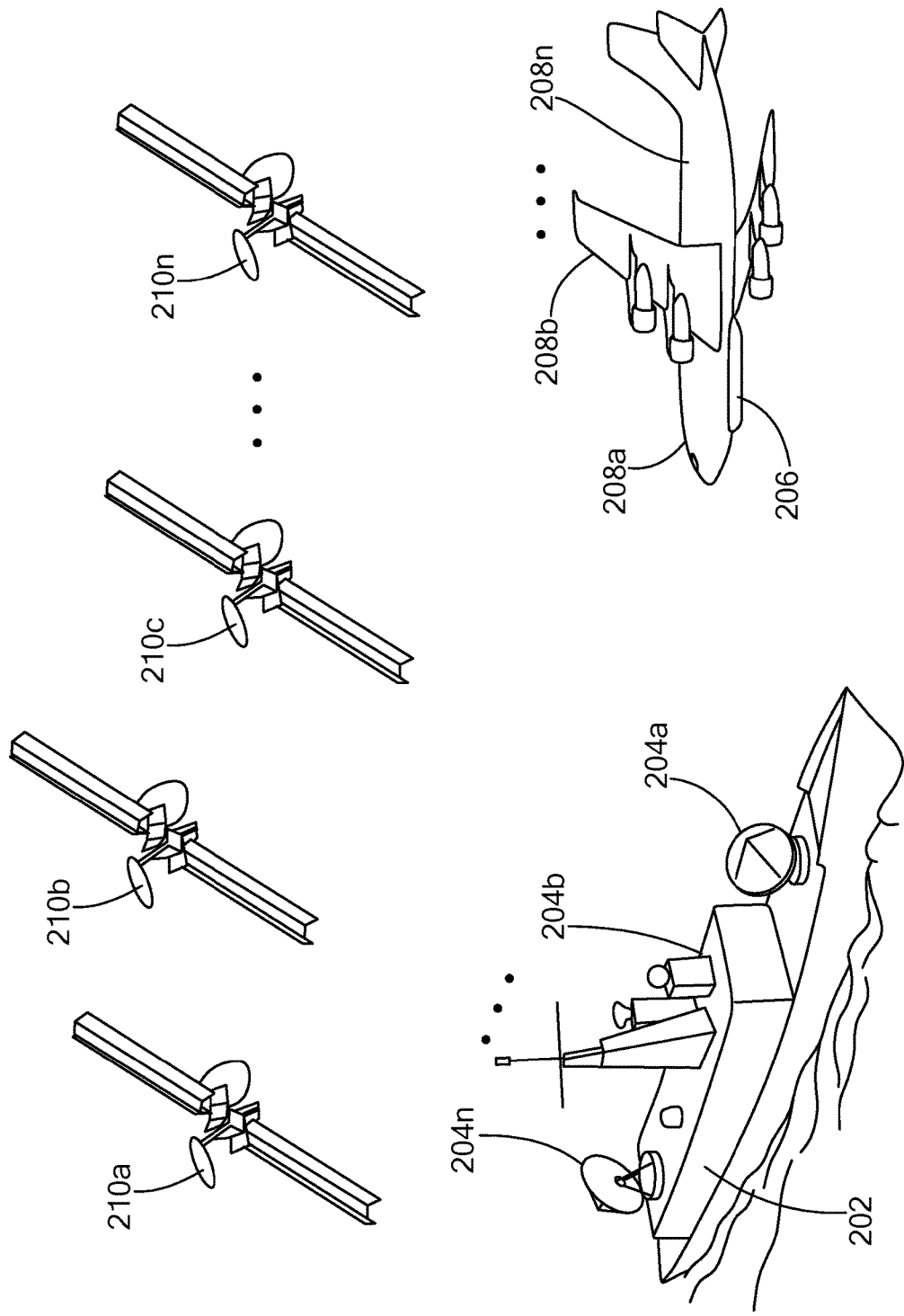
FIG. 2 is an illustration of a plurality of satellites and receivers positioned on moving platforms.

For example, and briefly referring to FIG. 2, an illustration is provided showing a ship 202, an airplane 206 and a plurality of satellites 210a-210n. The ship 202 may include a plurality of receivers 204a-204n and the airplane may include a plurality of receivers 208a-208n. Each of the receivers 204a-204n, 208a-208n may be installed or otherwise positioned at different positions on the ship 202 and/or the airplane 206. In some embodiments, a receiver or receivers, as referred to herein, may refer to any receiver that can measure pseudo range and/or a carrier phase from a transmitter or group of transmitters from a known location using from global navigation satellite systems (GNSS) satellites or pseudolite systems. In an embodiment, a satellite-receiver track may refer to a signal path or individual track between at least one receiver 204a-204n, 208a-208n and at least one satellite 210a-210n. Each of the receivers 204a-204n, 208a-208n may be global position system (GPS) receivers and each of the satellites 210a-210n may be GPS satellites.

In an embodiment, the ship 202 and/or the airplane 206 may be moving and thus comprise a moving platform. A moving platform as used herein may refer to any type of vehicle, object or mode of transportation, such as those used for air, road, railroad or sea transportation. In some embodiments, a moving platform may refer to a moving part or surface of an otherwise stationary vehicle or object.

A moving platform should have precise information for the platform's roll, pitch and yaw angles, in order to compare or combine carrier phase measurements across the multiple receivers 204a-204n or 208a-208n for carrier phase monitoring and to determine accurate platform attitude information. In an embodiment, the platform attitude may refer to the platform's orientation relative to a reference line or plane (e.g., horizon, ground). The platform's attitude may be based upon the platform's roll, pitch, yaw angles relative to the reference line or plane.

To combine carrier phase measurements, each of the phase measurements should have an accuracy within a predetermined error bound or threshold. However, carrier phase measurements on a moving platform can be susceptible to a wide range of errors, including those caused by various environmental changes (e.g., multipath, partial blockages, platform flexure). For example, position data from previous and/or subsequent carrier phase measurements may change as the moving platform flexes under physical stress and a relative distance between the receivers 204a-204n, 208a-208n themselves changes and/or a distance between the receivers 204a-204n, 208a-208n and satellites 210a-210n changes as a result of the flexing. Thus, a previous measurement based on a previous position of a receiver or group of receivers (e.g., two or more) may no longer be accurate. These inaccurate carrier phase measurements can result in inaccurate platform attitude solutions. In an embodiment, carrier phase monitoring system 104 may perform real time carrier phase monitoring and real time determination of platform attitude by identifying satellite-receiver tracks having inaccurate carrier phase measurements and excluding them as inputs in the real time determination of platform attitude.

Referring back to FIG. 1, the pre-screen module 110 may be a first part of the carrier phase monitoring. The pre-screen module 110 may determine single and/or double differences across multiple receivers. In an embodiment, a single difference measurement may include data corresponding to a signal path between two receivers and a single satellite. A double difference measurement may include data corresponding to signal paths between two receivers and two satellites. The single difference measurement may be used to identify the difference between two receiver observables where a receiver observable can include observable GPS data or a line of sight (LOS) unit vector for each receiver. The double difference measurement may be used to identify the difference between the single difference measurements of two GPS satellites using the same two receivers for both single difference measurements.

The double differencing may be performed via inter-frequencies (e.g., between frequencies over a given range (e.g., L-band)) and over a specified time period, using any known GPS signals (e.g., L1 and L2 signals) on a single receiver. The pre-screen module 110 will be described in greater detail with respect to FIG. 3 below. Satellite-receiver tracks that pass the pre-screen may be provided to the RTAD module 120. In an embodiment, the pre-screen module 110 may identify outlier satellite-receiver tracks, for example, satellite-receiver tracks having inaccurate carrier phase measurements, before they are used in the attitude solution.

The RTAD module 120 may determine attitude solutions based on received data corresponding to the satellite-receiver tracks that have passed through the pre-screen module 110. In an embodiment, the RTAD module 120 may perform RTAD determinations that are the same or similar to the systems and methods described in U.S. patent application Ser. No. 13/236,575, filed on Sep. 19, 2011, which is incorporated herein by reference in its entirety.

In some embodiments, the RTAD module 120 may use the double difference measurements from the pre-screen and/or carrier phase measurements corresponding to the satellite-receiver tracks to generate a multiple dimensional state vector. In other embodiments, the RTAD module 120 may generate new single and double difference measurements to generate the multiple dimensional state vector. The RTAD module 120 may use the multiple dimensional state vector to determine an attitude correction. In some embodiments, the RTAD module 120 may determine a convergence level of the attitude correction and other RTAD measurements. The RTAD module 120 will be described in greater detail with respect to FIG. 3 below. The RTAD measurements, including the attitude correction, may be provided to the post-screen module 130.

In an embodiment, a system may be considered to have achieved convergence when the carrier phase error bounds for satellite-receiver tracks used in attitude determination, the estimated attitude, and the resultant attitude observable residuals (for example double-difference residuals) are all simultaneously in agreement within a specified tolerance. This consistency among the three sets of data (e.g., error bounds, attitude and attitude observable residuals) ensures that the attitude and error bounds are determined correctly.

In an embodiment, the post-screen module 130 may perform similar screening methods as the pre-screen module 110. For example, if the pre-screen module 110 and RTAD module 120 solved for all or almost all the double difference carrier phase integer ambiguities, the post-RTAD processing may be completed and may not need to be performed as all of the outlier satellite-receiver tracks having inaccurate carrier phase measurements have been identified and excluded from subsequent determinations. In an embodiment, the post-screen module 130 may perform a verification of the data received from the satellite-receiver tracks used in the pre-screen module 110 and RTAD 120 to determine if the data was acceptable and within error thresholds.

In some embodiments, the post-screen module 130 may perform the same or substantially similar decomposed residual screening that the pre-screen module 110 performs, but because RTAD module 120 just ran this epoch, the attitude error may be less than in the pre-screen module 110 as outlier satellite-receiver tracks have been removed, allowing for a tighter threshold on track screening. For example, in some embodiments, the error thresholds may be reduced in the post-screen module 130 as compared to those error thresholds used in the pre-screen module 110 to create a tighter threshold on track screening.

In an embodiment, the post-screen module 130 may flag satellite-receiver tracks and provide them to the pre-screen module 110 as being flagged, to form a feedback mechanism. The feedback mechanism may allow the RTAD module 120 to improve its attitude solution as it is receiving better screened data. Thus, each of the pre-screen module 110, RTAD module 120 and post-screen module 130 form a reliable way to maintain a good attitude solution and provide carrier phase monitoring such that it appropriately de-weights or removes carrier phase measurements that are not within an acceptable range (beyond a threshold value) from being used in the platform attitude solution or in a relative position solution with the platform. The post-screen module 130 will be described in greater detail with respect to FIG. 3 below.

Figure 3:
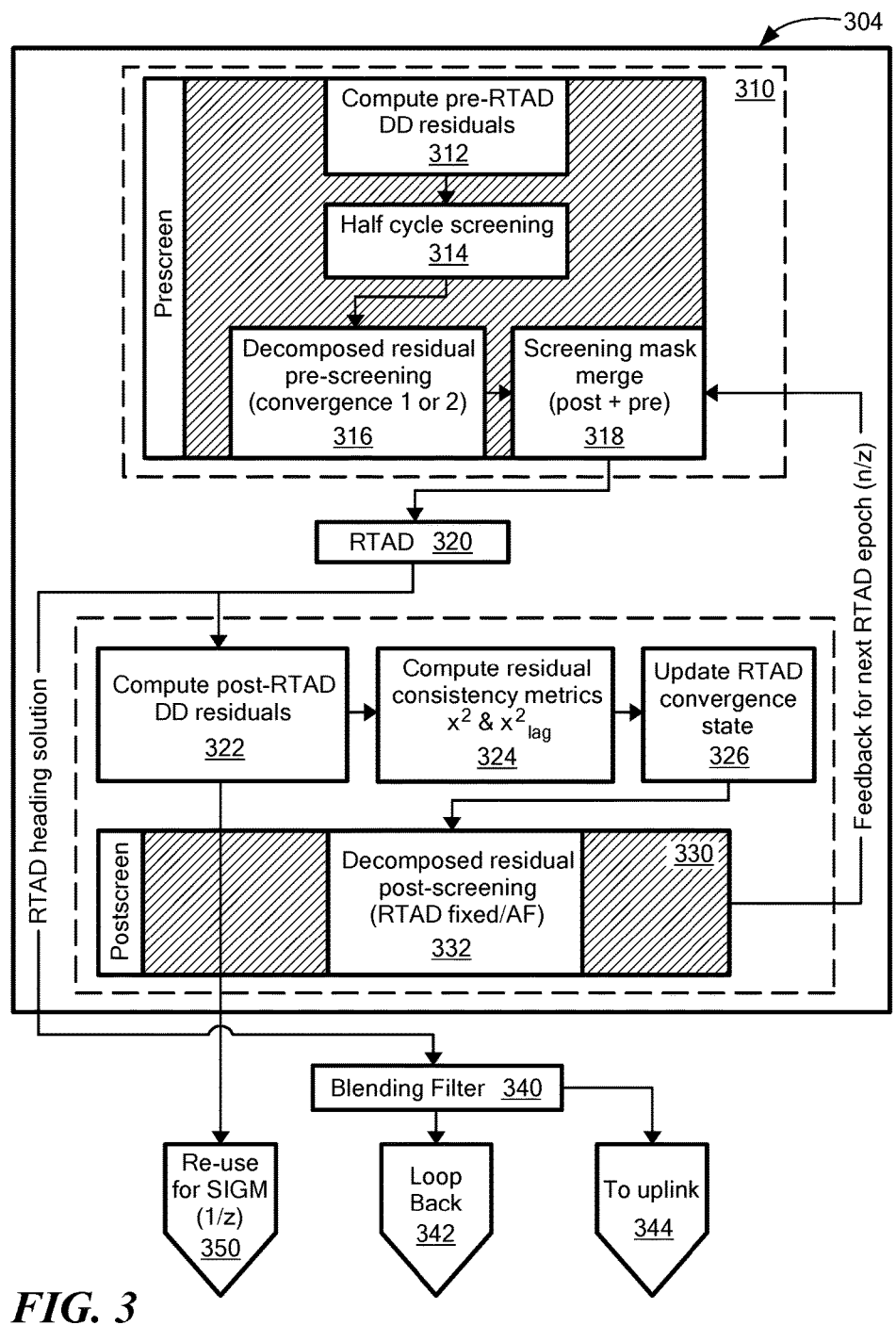
FIG. 3 is a block diagram of a carrier phase monitoring system.

Now referring to FIG. 3, a carrier phase monitoring system 304 includes a pre-screen module 110, a RTAD module 120 and a post-screen module 130.

The pre-screen module 110 may include a double difference residuals module 312, a half cycle screening module 314, a decomposition module 316 and a screen mask module 318. In an embodiment, the double different residuals module 312 may generate double difference residuals based on carrier phase measurements from received satellite-receiver tracks. For example, the double difference residuals module 312 may generate a first single difference measurement by comparing carrier phase measurements of a first signal between two receivers and a first satellite and a second single difference measurement by comparing carrier phase measurements of a second signal between the same two receivers and a second satellite. The double difference residuals module 312 may then determine a double difference residual by subtracting the first and second single difference measurements from each other (e.g., two single difference measurements between the same two receivers and the first and second satellites from each other). The double difference residuals may be un-normalized double difference residuals (e.g., L1 un-normalized double difference residuals, L2 un-normalized double-difference residuals) and may be transmitted to the half cycle screening module 314.

The half cycle screening module 314 may identify half cycle tracks using the double different residuals. In some embodiments, the half cycle screening module 314 may remove (e.g., filter out) satellite-receiver tracks having double difference residuals greater than or equal to a double difference residual threshold value before the half cycle screening is performed. The half cycle screening module 314 may identify and remove half cycle tracks as part of the half cycle tracking.

Half cycle tracks may refer to a phenomenon where a receiver locks onto a track that is biased/offset by a half cycle (e.g., a half cycle bias) with respect to other satellite-receiver tracks on the L1 and/or L2 carrier phase and persists indefinitely during continuous tracking. In an embodiment, as part of half cycle tracking, the half cycle screening module 314 may identify satellite-receiver tracks having a double difference residual that is biased by a half cycle track from a beginning of a tracking segment (i.e., when tracking is established or re-established by a receiver) and remove them from subsequent determinations.

In an embodiment, the half cycle screening may be performed by the half cycle screening module 314 by comparing a L1 un-normalized double difference residual average across all tracks containing an individual satellite track between each receiver and satellite (or an average L1 un-normalized double difference residual for the individual track) against the average of all other un-normalized double difference residuals that do not contain the track. In some embodiments, the half cycle screening may be performed using a L2 un-normalized double difference residual average. In an embodiment, the difference between the averages is compared against a half cycle threshold value. In some embodiments, the average L1 un-normalized double difference may be based on prior measurements or iterations of carrier phase measurements or based on a predetermined desired average L1 un-normalized double difference. An individual track may be removed (filtered out) if its corresponding L1 un-normalized double difference residuals (or its average L1 un-normalized double difference residual) is greater than or equal to the threshold value.

A removed track may stay removed from future carrier phase measurements for a predetermined time period. In some embodiments, the predetermined time period is a set number of epochs. For example, in one embodiment, a removed track may be kept out of subsequent carrier phase measurements until the set number of epochs is reached even if its average L1 un-normalized double difference residual has fallen below the half cycle threshold. In an embodiment, a more stringent threshold is used to set a track back to "good" after the track was previously removed due to failing the half cycle threshold. In some embodiments, a removed track may be added to a screened track list so that it is not used for attitude solutions, but can be monitored for future iterations.

In an embodiment, the satellite-receiver tracks having a L1 un-normalized double difference residual below the half cycle threshold may be transmitted to the decomposition module 316. The decomposition module 316 may identify individual tracks having a carrier phase error above a carrier phase error threshold value. For example, the double difference residuals can be a function of four measurement tracks as the double difference measurement may include data corresponding to four signal paths between two receivers and two satellites. Thus, the decomposition module 316 may break down the double difference residuals into decomposed residuals for each of the four tracks (e.g., each receiver to satellite measurement). Tracks having a carrier phase error greater than or equal to the carrier phase error threshold may be removed from subsequent carrier phase measurements.

For example, tracks having a carrier phase error greater than or equal to the threshold may not be transmitted to the RTAD module 120.

In some embodiments, the decomposition module 316 may perform a least squares fit determination to decompose the normalized double difference residuals squared into per track errors. Tracks with error over the carrier phase error threshold may be removed from being passed to the screen mask module 318 and/or RTAD module 120.

In an embodiment, the decomposition module 316 may transmit the decomposed residuals to the screen mask module 318. In an embodiment, the screen mask module 318 can track or otherwise store the a "screening" flags for all the satellite receiver tracks. For example, the tracks can be stored in a database and be organized by the respective receiver, receiver group and/or GNSS satellite pair. In some embodiments, the screen mask module 318 can set the "screening" flag to "don't use" when the carrier phase error exceeds the threshold (as discussed above). The screen mask module 318 may also set the "screening" flag to "valid" when sufficient time has elapsed with the carrier phase error remaining below a "good" or otherwise acceptable threshold. In some embodiments, all track flags can be initially set to "valid". In an embodiment, only measurements having a "valid" flag may be used in RTAD processing. Thus, the removed tracks are removed from being used in the RTAD module 120.

In some embodiments, the tracks having a carrier phase error greater than or equal to the carrier phase error threshold may be accounted for once the contributing measurement is isolated. For example, having multiple tracks with common measurements, it is possible to isolate contributions from the individual tracks. Therefore, increased carrier phase errors from an individual measurement track can show up in all double difference residuals containing the track in question. If multiple double difference residuals contain the track in question, then the track (i.e., problem track) can be isolated by decomposing the double difference residuals. The screen mask module 318 may transmit the remaining tracks, tracks having a "valid" flag, to the RTAD module 120.

In an embodiment, the RTAD module 120 may perform real time attitude determinations on the satellite-receiver tacks. For example, the RTAD module 120 may determine an attitude correction for a platform (e.g., moving platform) based on double difference residuals and carrier phase measurements from satellite-receiver tracks. The RTAD module 120 may determine an RTAD convergence state of the attitude correction.

In an embodiment, the measurement and data from the RTAD module 120 may be transmitted to the post-screen module 130. The post-screen module 130 may include a post-RTAD double difference residual module 322, a residual consistency metrics module 324, a RTAD convergence state module 326 and a post-RTAD decomposition module 332.

In an embodiment, the post-RTAD double difference residual module 322 may determine double difference residuals for satellite-receiver tracks used in the RTAD determinations by RTAD module 120. The post-RTAD double difference residual module 322 may determine double difference residuals in the same methods or substantially the same methods as described above with respect to the double difference residuals module 312. In some embodiments, the post-RTAD double difference residual module 322 may determine double difference residuals to check or verify the accuracy of the double difference residuals determined by the double difference residuals module 312. The post-RTAD double difference residual module 322 may transmit the double difference residuals (e.g., attitude corrected double difference residuals) to a sigma monitor 350.

In an embodiment, the sigma monitor 350 can be a real time monitor to ensure error bounds for GPS measurements are determined to support high integrity GPS applications. The sigma monitor 350 can actively monitor dynamic changes in receiver performance, in environmental effects and in any factors that may impact receiver measurement errors. Upon detection of an onset of a fault in a receiver, it can elect to exclude measurements from the respective receiver. Upon detection of an onset of elevated error level for a satellite-receiver track due to the environmental effects, the sigma monitor 350 can elect to either exclude that track or to properly inflate the corresponding error bounds to ensure that the actual measurement error is bounded by the updated value with high integrity.

In an embodiment, the residual consistency metrics module 324 may perform convergence tests on the RTAD measurements, including the attitude correction measurements, received from the RTAD module 120. For example, the residual consistency metrics module 324 may perform a first convergence state test and a second convergence state test to determine if the RTAD attitude solution has reached convergence. In some embodiments, the first and second convergence test may be a $X^2$ test to verify the consistency and accuracy of the RTAD measurements. The first and second convergence state test will be described in greater detail below with respect to FIG. 4.

In an embodiment, the RTAD convergence state module 326 may update a convergence state of one or more attitude corrections measurements. For example, the RTAD convergence state module 326 may indicate the RTAD measurements have reached convergence (e.g., reached a second convergence state), that the RTAD measurements have fallen below a convergence threshold and thus are no longer in convergence if they previously were in convergence. Further, the RTAD convergence state module 326 may indicate that the RTAD measurements from a previous epoch or iteration are still in convergence or still have not yet reached convergence. In some embodiments, carrier phase monitoring may be enabled or disabled responsive to a convergence state update.

In some embodiments, because the RTAD module 120 just ran during the most recent epoch, a phase or attitude error may be less in the post RTAD decomposition module 332 than in the pre-screen module 110 (i.e., performed by the decomposition module 316), allowing for a tighter threshold on track screening. For example, a carrier phase error threshold may be modified if the results of the post-RTAD decomposition module 332 indicate an average carrier phase error is less than a current carrier phase error threshold or greater than a current carrier phase error threshold. In other embodiments, the carrier phase error threshold may stay the same for both the pre-screen module 110 and the post-screen module 332.

In an embodiment, the carrier phase monitoring system 304 may be coupled to (e.g., communicatively) a blending filter 340. In other embodiments, the carrier phase monitoring system 304 may include the blending filter 340. The RTAD module 120 may transmit the RTAD measurements, including the attitude correction measurements, to the blending filter 340. The blending filter 340 may comprise an inertial navigation unit (INU)/GPS blending filter. In some embodiments, the blending filter may calculate the position, orientation, and velocity (direction and speed of movement)

of a platform using GPS measurements. Thus, in an embodiment, the blending filter 340 may combine (blend) GPS measurements with the attitude correction measurements to determine a platform attitude. In some embodiments, the determined platform attitude may be provided back to the pre-screen module 110 via a loop back mechanism 342. The determined platform attitude may be transmitted via a communications link 344 to various systems external and internal to the carrier phase monitoring system 304.

Figure 4:
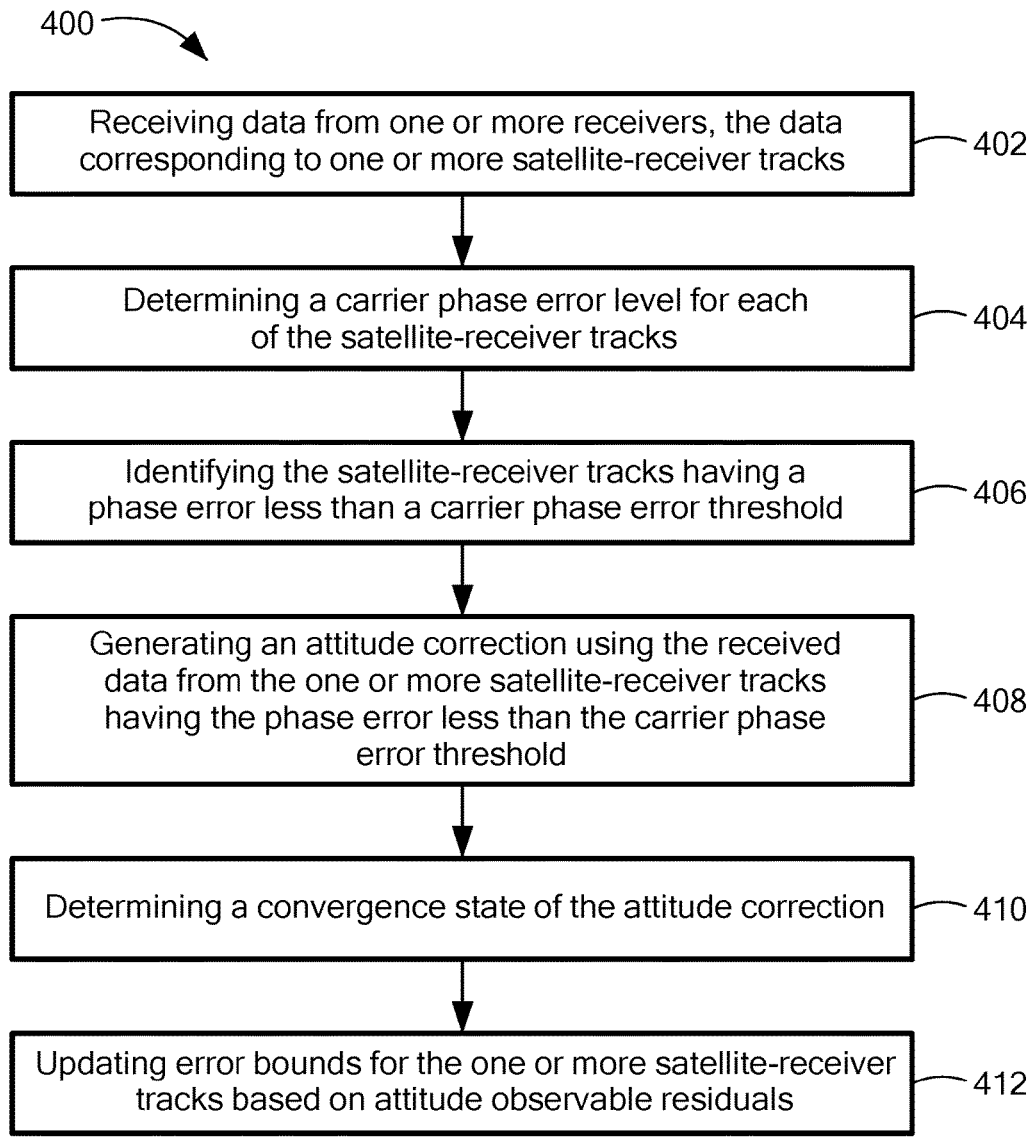
FIG. 4 is a flow diagram of a first method for performing carrier phase monitoring.

Now referring to FIG. 4, a flow diagram of a method 400 for performing carrier phase monitoring is provided. At block 402, data may be received from the plurality of receivers. The data may correspond to one or more satellite-receiver tracks. For example, the data may include a variety of different forms of positioning data. The data may include global navigation satellite system (GNSS) data, inertial measurement unit (IMU) data, carrier phase error characteristics, and carrier phase properties and/or measurements from an individual signal path (i.e., track) between at least one receiver and at least one satellite. In some embodiments, the data received may be stored in a database based on a receiver, a satellite, a satellite-receiver track or a combination of them. In some embodiments, the data may correspond to pseudo range (e.g., an approximation of the distance between a receiver and a satellite) and carrier phase measurements from a transmitter using a GNSS system or a pseudolite system.

At block 404, a carrier phase error level may be determined for each of the satellite-receiver tracks. The carrier phase error level may be determined as part of a pre-screening process that is performed on the received data to identify outliers or data that is outside an acceptable range that may inhibit accurate attitude correction measurements and carrier phase measurements.

Still referring to block 404, to determine the carrier phase error level, convergence test statistics may be determined for each of the satellite-receiver tracks. Convergence test statistics may include single difference measurements, double difference measurements and/or carrier phase measurements. For example, a double difference residual may be determined first for the satellite-receiver tracks. The double difference residuals and/or carrier phase measurements may be generated using the received data from the satellite-receiver tracks. To generate the double difference residuals, receivers and satellites may be grouped together. For example, one group may include at least two receivers and at least two satellites. A first single difference measurement may be generated for a signal transmitted between two receivers and a first satellite. Further, a second single difference measurement may be generated for a signal transmitted between the same two receivers and a second satellite. In an embodiment, the double difference residual may be determined by subtracting the first single difference measurement from the second single difference measurement. For example, the double difference may be defined as:

$$DD_f = (\varphi_{A,i,f} - \varphi_{B,i,f}) - (\varphi_{A,k,f} - \varphi_{B,k,f}) \quad \text{(Eq. 1)}$$

where, $\varphi_{A,i,f}$ is the carrier phase from receiver A, satellite i, frequency f, $\varphi_{B,i,f}$ is the carrier phase from receiver B, satellite i, frequency f, $\varphi_{A,k,f}$ is the carrier phase from receiver A, satellite k, frequency f, $\varphi_{B,k,f}$ is the carrier phase from receiver B, satellite k, frequency f and f is the frequency and can be L1, L2, wide lane, etc.

The un-normalized double-difference residual may be defined as:

$$DDresid_f = \mathrm{mod}(DD_f, \lambda_f) \quad \text{(Eq. 2)}$$

where, $\lambda_f$ is the wavelength of the selected frequency f.

Still referring to block 404, in some embodiments, the double difference residuals for each of the satellite-receiver tracks may be compared to a double difference residual threshold. Tracks can be identified having a double difference residual that is greater than or equal to the double difference residual threshold. The tracks identified as having a double difference residual that is greater than or equal to the double difference residual threshold may be removed (filtered out) from subsequent calculations in the carrier phase monitoring methods. Thus, tracks having high double difference residuals can be filtered out before half-cycle screening is performed. In an embodiment, the double difference residuals may be un-normalized double difference residuals and may be used to perform half-cycle track screening.

Still referring to block 404, half-cycle screening may be performed to remove tracks where an un-normalized double difference residual is determined to be biased by a half cycle from the beginning of a tracking segment (e.g. when tracking lock is established or re-established by the receiver). In an embodiment, the combination of pre-screening and half-cycle screening may ensure higher data quality for the RTAD input measurements, in order to reduce the chances of an incorrect fix (i.e., inaccurate attitude correction determination).

The half-cycle screening logic may be performed by comparing, for example, a L1 un-normalized double-difference residual for an individual satellite track between each receiver and satellite against an average L1 un-normalized double-difference residual for all other tracks combined. Thus, satellite-receiver tracks can be identified having a carrier phase error level greater than or equal to a carrier phase error threshold.

The average L1 un-normalized double-difference residual may establish a double difference residual threshold (i.e., tolerance value) to identify outlier tracks. In some embodiments, the average L1 un-normalized double-difference residual may include data from prior iterations of carrier phase monitoring and/or may be a predetermined value established by the carrier phase monitoring system.

In other embodiments, the half-cycle screening logic may be performed using a L2 un-normalized double-difference residual for an individual satellite track and an average L2 un-normalized double-difference residual for all other tracks combined. Thus, it should be appreciated that the half-cycle screening logic may be performed using L1 un-normalized double-difference residual values, L2 un-normalized double-difference residual values, or any linear combination of dual or multiple frequencies.

A track may be screened (removed) if its average L1 (or L2) un-normalized double-difference residual exceeds the threshold that is established using the average of all other tracks. In some embodiments, the threshold may account for and include an additional inflation. The threshold may be defined as $tolerance_{half\_cycle\_screen}$:

$$track\_screened_j = \quad \text{(Eq. 3)}$$

-continued $$\frac{\Sigma DDresid_j}{DDcount_j} > \frac{\Sigma DDresid_{\sim j}}{DDcount_{\sim j}} + tolerance_{half\_cycle\_screen}$$

where, $$\Sigma DDresid_{\sim j} = \Sigma DDresid - DDresid_j \quad \text{(Eq. 4)}$$

$$DDcount_{\sim j} = DDcount - DDcount_j \quad \text{(Eq. 5)}$$

where j denotes the values that use the track of interest, and ~j denotes the values for all double-difference residuals that do not use the track of interest. In an embodiment, the threshold (tolerance$_{half\_cycle\_screen}$) can be tuned or modified based on previous data or iterations of carrier phase monitoring. For example, the threshold may be tuned to identify an acceptable tolerance level and to account for changes in an environment in which carrier phase monitoring is being performed from a previous session. In one embodiment, the threshold may be manually tuned based on a one day of at-sea ship data or other moving platform data accumulated over a predetermined time period.

Still referring to block 404, in an embodiment, once a track is screened, the track may remain screened for a predetermined time period. For example, the predetermined time period may be a set number of epochs, also referred to as recovery_count$_{half\_cycle\_screen}$. In some embodiments, the track may remain screened for the predetermined time period even if its corresponding un-normalized double-difference residual average is no longer greater than or equal to the threshold (i.e., has fallen to an acceptable tolerance level below the threshold). The recovery period may prevent a track whose un-normalized double-difference residual average crosses above and below the threshold repeatedly from toggling its screening status, ensuring that it stays screened until the event has truly passed.

The screened tracks may be stored in a database and added to a list, screening_mask$_{half\_cycle}$, which can be combined with the list of screened tracks from the previous iterations of carrier phase monitoring, from the pre-screening logic, as well as the post-screening logic from a previous epoch, in order to form the full set of screened tracks. In an embodiment, tracks that pass the pre-screening (double difference residual threshold and half-cycle screening) may be transmitted to an RTAD module (e.g., RTAD module 120 of FIG. 1 and FIG. 3) for RTAD processing. The tracks that pass the pre-screening may be transmitted to the RTAD module as part of block 404 or block 406 of method 400.

It is should be appreciated that half-cycle screening may be performed to screen out tracks with a half-cycle bias, and may not screen tracks biased at other multiples, such as tracks at multiples that are less than a half-cycle, including a quarter-cycle bias. However, screening may be performed to screen tracks biased at other multiples including but not limited to quarter-cycle bias. Further, tracks biased at other multiples and having high un-normalized double-difference residuals can also be screened out by the half-cycle detection logic if their average un-normalized double-difference residual exceeds the threshold.

At block 406, satellite-receiver tracks having the carrier phase error level greater than or equal to a carrier phase error threshold can be decomposed. In an embodiment, tracks passing the half-cycle screening may be decomposed to identify carrier phase error levels associated with each individual track. For example, the double difference residuals computed can be functions of four measurement tracks (e.g., tracks between a first receiver and two satellites and tracks between a second receiver and two satellites). As the measurements of individual tracks are grouped together to generate the double difference residuals, it can be difficult to isolate tracks measurements with increased carrier phase error. Therefore, it can be desirable to break down the measurements into a decomposed residual for each individual track (i.e., a single receiver to a single satellite measurement).

Still referring to block 406, tracks with a carrier phase error greater than or equal to a carrier phase error threshold can be removed from subsequent carrier phase measurements or can be accounted for once the contributing measurement is isolated. For example, with a system having multiple tracks with common measurements, it may be possible to isolate contributions (e.g., errors) from the individual tracks. Increased carrier phase errors from an individual measurement track can show up in double difference residuals containing the track in question. Therefore, if multiple double difference residuals contain the track, then the problem track can be isolated by decomposing the double difference residuals.

In an embodiment, the double difference residuals can be decomposed using a Least Squares Fit (LSF) based on an individual track index. For an LSF:

$$A\vec{x} = \vec{b} \quad \text{(Eq. 6)}$$

where A is an m×n matrix, where m is the number of double difference residual measurements available, and n is the maximum number of tracks possible based on the double difference residuals $\vec{b}$ is the lagged double difference squared residuals, $\vec{x}$ is the desired decomposed normalized square residual error corresponding to each individual track, and A is the indexing and weighting matrix used to correlate double difference measurements to the individual measurement tracks that they stem from. Lag filtered measurements may be used in order to more appropriately weight longer tracks in the decomposition.

In an embodiment, $A_{ij}$ can be equal to $Var_i^{lag}$ when an individual track exists in any double difference residual measurement. $A_{ij}$ may be equal to zero if an individual track does not exist in any double difference residual measurement. The index i corresponds to the double difference residual that contains the track, and the index j corresponds to the individual track. The $Var_i^{lag}$ represents the lagged variance of the unique double difference quadruple. Thus, $A(i,j) = Var_i^{lag}$ if DD(i) includes a measurement from j, where DD(i) is a double difference residual. In an embodiment, with the A matrix populated, the standard least squares computation can be done as follows:

$$\vec{x} = (A^T A)^{-1} A^T \vec{b} \quad \text{(Eq. 7)}$$

where superscript T is the matrix transpose operation. The resulting values for $\vec{x}$ are the decomposed normalized square residuals for individual tracks.

Still referring to block 406, in an embodiment, the decomposition can discriminate an outlier track by decomposing the double difference residuals that it is involved in. For example, tracks used in a double difference residual measurement may have carrier phase errors over the carrier phase error threshold. These tracks can be removed and screened out before being generating an attitude solution.

At block 408, an attitude correction can be generated using the received data from the satellite-receiver tracks having the carrier phase error level less than the carrier phase error threshold. For example, an attitude correction may be determined based on double difference residuals and carrier phase measurements from the satellite-receiver tracks. The RTAD measurements will be described in greater detail below with respect to FIG. 5.

At block 410, a convergence state of the attitude correction can be determined. In an embodiment, the convergence level of the RTAD measurements can be determined in at least two stages (i.e., first convergence state, second convergence state). The convergence state determination may be part of a post-screening process to assess a quality of the satellite-receiver tracks that passed the pre-screening, the quality of the RTAD measurements and the quality of the satellite-receiver tracks that may be used in a next iteration of carrier phase monitoring. For example, a first convergence state of the attitude correction may be determined and then a second convergence state of the attitude correction may be determined.

The RTAD measurements may reach the first convergence state by identifying consistency in double difference residuals for the current epoch. The RTAD measurements may reach the second converge state by identifying consistency in double difference residuals over a specific time period. In some embodiments, once the second convergence state has been reached, carrier phase monitoring may be enabled (e.g., activated). The second convergence state may indicate that the RTAD measurements (e.g., attitude correction) are accurate and reliable. The convergence level of the RTAD measurements may be continuously monitored, and if convergence is lost, carrier phase monitoring may be disabled responsive to the loss of convergence.

Still referring to block 410, in an embodiment, to determine the first convergence level of the RTAD measurements, the double difference measurements can be normalized using an a priori sigma to account for survey, flexure and attitude translation error of a platform that the receivers are stationed on. The priori sigma can be different for each pair of receivers because each receiver can have a different amount of survey and flexure error and each pair can have a different baseline distance that can create a different amount of attitude translation error. In some embodiments, the sigma can be determined during initial set up by processing data from previous iterations of carrier phase monitoring. For example, the sigma may be determined based on a previous day of data and overbounding a histogram of double difference residuals for each receiver pair. In some embodiments, a single sigma may be used for each pair of clusters of receivers. For example, receivers from the same cluster that may be near each other may have similar survey and flexure errors, as well as similar attitude translation errors. Thus, they may share about the same sigma value. The normalized double difference residual may be defined as:

$$DDresid\_norm_{m,n,f} = \frac{DDresid_{m,n,f}}{\sigma_{agg,m,n,f}} \quad \text{(Eq. 8)}$$

where $DD_{resid\_norm}$ is the normalized double difference residual, $DD_{resid}$ is the un-normalized double difference residual, $\sigma_{agg,m,n,f}$ is the sigma value to account for survey, flexure and attitude translation error of a platform that the receivers are stationed on. [

In an embodiment, an $X^2$ test (i.e., chi-squared test) may be performed to determine a likelihood that any observed differences between the RTAD measurements for different tracks are not signs of data outside an acceptable range and thus, determine a first convergence state of the RTAD measurements. The $X^2$ test may be performed by summing all the normalized double difference residuals squared for a current epoch and checking it against a threshold. In some embodiments, the threshold may be a 95% probability that the hypothesis is correct. In other embodiments, different levels of (e.g., less than 95% probability, greater than 95% probability) may be used to verify that the hypothesis is correct. The $X^2$ test may be defined as follows:

$$\chi^2 = \Sigma DDresid\_norm_j^2 < chi2inv(0.95, dof) \quad \text{(Eq. 9)}$$

where, dof=the degrees of freedom (number of normalized DD residuals minus the number of solution angles solved for by RTAD) and chi2inv=the inverse of the $\chi^2$ distribution formed using dof for the degrees of freedom. In embodiment, when the RTAD measurements have passed the $X^2$ test, they have reached the first convergence state.

Still referring to block 410, responsive to reaching the first convergence state, a second convergence state of the RTAD measurements may be determined. In some embodiments, the test for the second convergence state may be an $X^2$ test, but uses lagged normalized double difference residuals squared to verify consistency over time period, and in doing so the degrees of freedom for the test may also be lagged, making the threshold also lagged. In an embodiment, lagged values may be used to incorporate feedback and convergence of the data over time. For example, a current convergence state can be determined using past values (e.g., lagged values).

In an embodiment, each unique double difference measurement quadruple j (1 pair of satellites and 1 pair of receivers), may have its measurement lagged using the following formula:

$$DDresid^2_{norm_{lag_{j,i}}} = \quad \text{(Eq. 10)}$$

$$\begin{cases} k * DDresid^2_{norm_{lag_{j,i-1}}} + \\ \quad DDresid^2_{norm_{j,i}}, & \text{if } DDresid^2_{norm_{j,i}} \text{ exists} \\ k * DDresid^2_{norm_{lag_{j,i-1}}}, & \text{otherwise} \end{cases}$$

where, k=the lagged gain constant, j=each unique double difference measurement quadruple (1 pair of satellites and 1 pair of receivers), i is the current epoch and i-1 is the previous epoch.

In an embodiment, the total count of double difference measurements may also be lagged using the following formulas:

$$DDresid_{cnt_{lag_i}} = k * DDresid_{cnt_{lag_{i-1}}} + DDresid_{cnt} \quad \text{(Eq. 11)}$$

$$dof_{avg_{lag}} = \left(\frac{\tau_{lag}}{\frac{\tau_{corr}}{2}}\right) * \left(\frac{DDresid_{cnt_{lag_i}}}{RTAD\_Frames} - Num\_RTAD\_soln\_angles\right) \quad \text{(Eq. 12)}$$

where, $DDresid_{cnt}$=total double difference measurements used in RTAD this epoch, RTAD_Frames=the number of times RTAD has executed, Num_RTAD_soln_angles=the number of solution angles used in RTAD, $\tau_{corr}$ residual correlation time, and τ_lag=the lag filter time constant. In an embodiment, equation 12 (i.e., $dof_{avg_{lag}}$) is the degrees of freedom of the double difference measurements (e.g., the number of normalized DD residuals minus the number of solution angles solved for by RTAD).

The second convergence state test may be defined by the following formula:

$$\chi^2_{lag} = dof_{avg_{lag}} * \frac{\Sigma DDresid^2_{norm_{lag\,j,i}}}{DDresid_{cnt_{lag_i}}} < chi2inv(0.95.dof_{avg_{lag}}) \quad \text{(Eq. 13)}$$

In embodiment, the RTAD measurements may be considered to have reached the second convergence state if the above test is passed (result is greater than or equal to the threshold). Although the test above indicates a 95% probability factor, it should be appreciated that other probability factors (e.g., less than 95% probability, greater than 95% probability) may be used to determine if RTAD measurements have reached the second convergence state.

At block 412, error bounds can be updated for the satellite-receiver tracks based on attitude observable residuals. In an embodiment, the post-screening may provide a feedback mechanism for subsequent iterations of carrier phase monitoring. For example, if tracks are identified and flagged to be screened in the post-screening (post-RTAD), the flagged tracks may be passed back to a pre-screen module (e.g., pre-screen module 110) to be screened for the next RTAD epoch. Thus, the feedback mechanism allows RTAD to improve its attitude solution.

In some embodiments, the error bounds for the satellite-receiver tracks may be updated or otherwise modified if the respective track or tracks are identified and flagged to be screened in the post-screening (post-RTAD). For example, the attitude observable residuals may include the double difference residuals. The double difference residuals determined during the post-screening may be used to generate per track error sigma scale factors. Thus, each of the pre-screen, RTAD and post-screen may provide a reliable way to maintain a good attitude solution and provide carrier phase monitoring such that it appropriately de-weights or removes poor carrier phase measurements from being used in the platform attitude solution or in a relative position solution with the platform.

Figure 5:
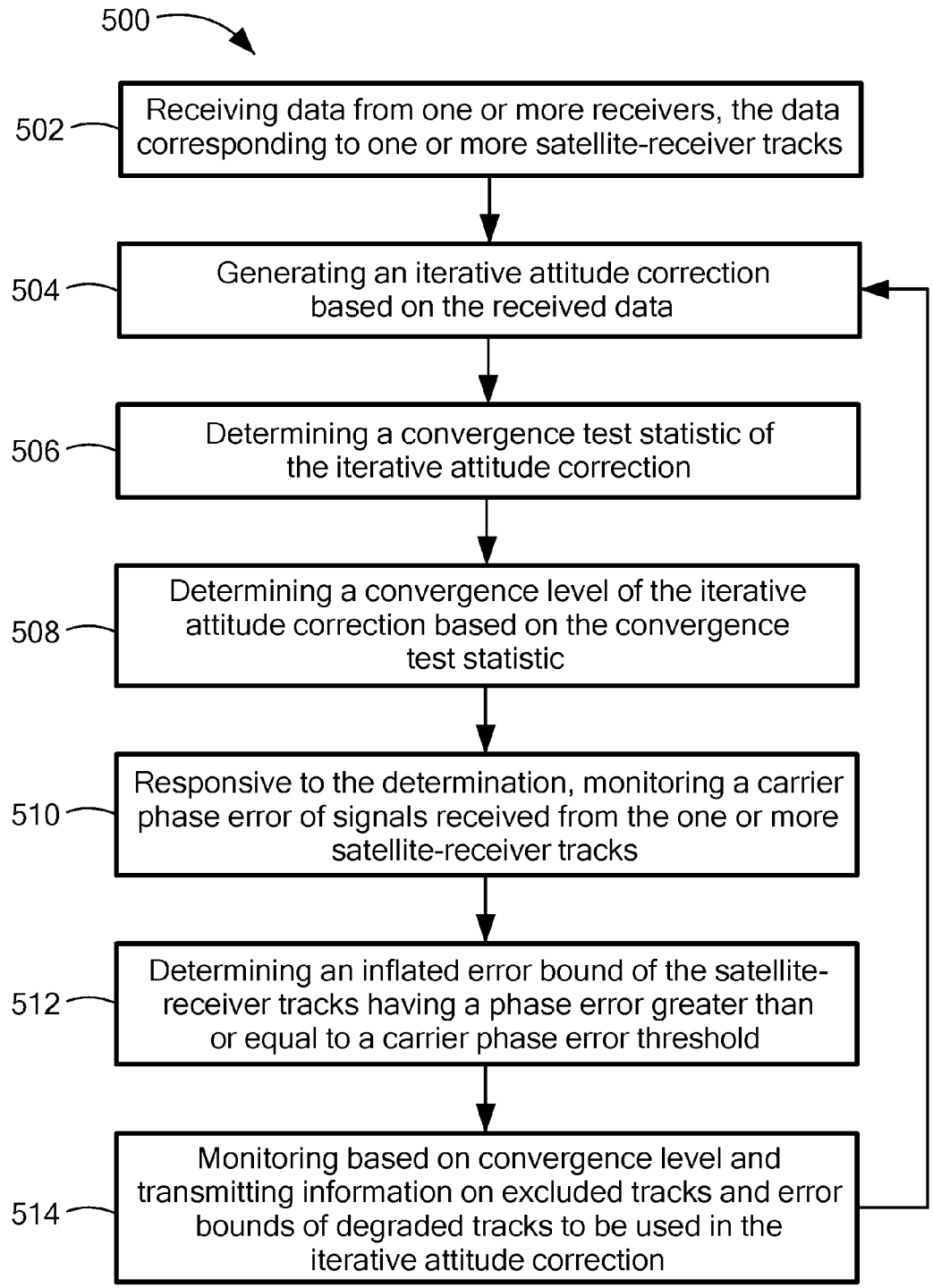
FIG. 5 is a flow diagram of a second method for performing carrier phase monitoring.

Now referring to FIG. 5, a flow diagram of a method 500 for performing carrier phase monitoring is provided. In an embodiment, method 500 may be similar to method 400 of FIG. 4, however method 500 includes an initialization process at the beginning. For example, method 500 may be used upon initial startup of a system in which the accuracy of data has not been verified yet. Thus, in an embodiment, data initially received in method 500 may be assumed to be accurate. An iterative attitude correction can be generated based on the initial data and a convergence level of the iterative attitude correction can be calculated to determine a true accuracy of the initial data. Thus, in subsequent iterations, the iterative attitude correction can be modified such that it is within acceptable error bounds. In an embodiment, the monitoring of carrier phases may begin once the iterative attitude correction is determined to be within acceptable error bounds.

At block 502, data may be received from a plurality of receivers. The data may correspond to the satellite-receiver tracks. For example, the data may include global navigation satellite system (GNSS) data, inertial measurement unit (IMU) data, carrier phase error data and/or measurements from an individual signal path (i.e., track) between at least one receiver and at least one satellite. The data received may be stored in a database based on a receiver, a satellite, a satellite-receiver track or a combination of them.

In some embodiments, prior to performing carrier phase monitoring, the received data may be analyzed to determine if it is accurate and/or if it includes any data from satellite-receiver tracks having properties outside an acceptable range (e.g., greater than or equal to a threshold value). To identify these satellite-receiver tracks, attitude correction solutions may be generated using the received data and those measurements may be analyzed to determine a convergence level of them. In some embodiments, responsive to determining the attitude correction measurements (e.g., RTAD measurements) have reached a first and second convergence state, carrier phase monitoring may be enabled.

For example, carrier phase monitoring may resolve the relationship between platform attitude accuracy and carrier phase measurement monitoring by first ensuring that the platform attitude solution has reached a converged state, at which point a carrier phase monitoring system can monitor and screen out bad tracks before they have a chance to negatively impact the next attitude solution. Therefore, in some embodiments, a convergence state of attitude solution determined using the received data may be determined prior to beginning carrier phase monitoring.

At block 504, an iterative attitude correction may be generated based on the received data. In some embodiments, the attitude correction may be generated using attitude observables such as double difference measurements and carrier phase measurements corresponding to the satellite-receiver tracks. In an embodiment, RTAD may be performed on the received data from the satellite-receiver tracks to determine an attitude correction.

At block 506, a convergence test statistic(s) may be determined for the iterative attitude correction. Convergence test statistics may include single difference measurements and double difference measurements for the received data. The receivers and satellites may be grouped together to perform the single difference and double measurements. For example, the single difference measurements may include data corresponding to a signal path between two receivers and a single satellite. A double difference measurement may include data corresponding to signal paths between two receivers and two satellites. In an embodiment, the single difference measurement may be used to identify the difference between two receiver observables where a receiver observable can include observable GPS data or a line of sight (LOS) unit vector for each receiver. The double difference measurement may be used to identify the difference between the single difference measurements of two GPS satellites using the same two receivers for both single difference measurements.

In an embodiment, a multi-dimensional state vector of integer ambiguities and multi-dimensional corrections using the double difference measurements may be generated. Using the multi-dimensional state vector, an attitude correction can be generated. In some embodiments, a multi-dimensional observation matrix may be generated for each grouping of receivers and satellites (e.g., each pair of two receivers and two satellites). The generated attitude correction measurements may be verified by performing a convergence test.

At block 508, a convergence level of the iterative attitude correction may be determined. The convergence level may be determined the same or substantially the same as described above with respect to FIG. 4. For example, the convergence level may be determined in different states. a first convergence state of the attitude correction measurement may be determined and then a second convergence state of attitude correction measurement may be determined. In some embodiments, the convergence level of the attitude correction may be determined based on the convergence test statistics.

In an embodiment, the first and/or second convergence state tests may be a form of an $X^2$ test used to determine how likelihood that any observed differences between the attitude correction measurement for different tracks are not signs of data that is outside an acceptable range and thus determine a convergence state of the attitude correction measurement. The $X^2$ test may be performed by summing all the normalized double difference residuals squared for a current epoch and checking it against a threshold. The second convergence state test may be different from the first convergence state test in that a time lag may be introduced.

The first convergence test statistic of the iterative attitude correction may be compared to a convergence threshold to determine if the convergence level is greater than or equal to level one. In some embodiments, responsive to performing a test for a second convergence state, the convergence test statistic of the attitude correction measurement may be compared to a convergence threshold to determine if the convergence level is two. The convergence threshold may be probability factor that the attitude correction measurement is accurate or within an acceptable range. For example, in some embodiments, the threshold may be a 95% probability that the hypothesis is correct. In other embodiments, different levels of (e.g., less than 95% probability, greater than 95% probability) may be used to verify that the hypothesis is correct. In an embodiment, if the result of the second convergence state test is greater than or equal to the convergence threshold, the attitude correction measurement (i.e., RTAD measurements) may be considered to have reached convergence. The convergence threshold (and second convergence state) may indicate that the attitude correction measurements are accurate or within an acceptable range.

At block 510, responsive to the determination, monitoring carrier phase errors of signals received from the satellite-receiver tracks. In some embodiments, when the RTAD measurements have reached the second convergence state, carrier phase monitoring may be enabled. Carrier phase monitoring may be performed the same or substantially the same as described above with respect to FIG. 4. For example, the carrier phase monitoring may include at least parts [?], a pre-screen, RTAD measurements and a post-screen. The pre-screen may identify outlier tracks before they are used in an attitude solution. The RTAD may determine an attitude solution and a convergence level of the attitude solution. The post-screen may perform similar methods to the pre-screen however using only those tracks that have been passed through the pre-screen and RTAD.

At block 512, monitoring the carrier phase errors may include determining the inflated error bound (or track exclusion) of the satellite-receiver tracks having a carrier phase error greater than or equal to a carrier phase error threshold. For example, double difference measurements and carrier phase measurements may be generated for the satellite-receiver tracks being monitored. The double difference measurements may be used to identify half cycle tracks in the satellite-receiver tracks. Satellite-receiver tracks having half cycles may be filtered out or removed from being included in subsequent carrier phase measurements.

In an embodiment, the double difference measurements may be decomposed to identify the satellite-receiver tracks with the carrier phase error greater than or equal to the carrier phase error threshold. For example, in some embodiments double difference residual energies may be decomposed into carrier phase error estimates for the satellite-receiver tracks to identify any tracks with the carrier phase error greater than or equal to the carrier phase error threshold. In an embodiment, double difference residual energies may be a type of double difference measurement. In some embodiments, a least squares fit determination may be performed to decompose the double difference measurements.

At block 514, carrier phase monitoring of satellite receiver tracks may be performed based on convergence level and information on excluded tracks (e.g., satellite-receiver tracks having a carrier phase error greater than or equal to a carrier phase error threshold) and error bounds of degraded tracks may be transmitted to be used in the iterative attitude correction. In an embodiment, information can be continually passed along to the iterative processing in block 504 to maintain robust convergence levels of the attitude correction. For example, information may be transmitted from post-screen module 130 to pre-screen module 110 of FIG. 1 and/or post-screen module 130 to pre-screen module 110 of FIG. 3.

Figure 6:
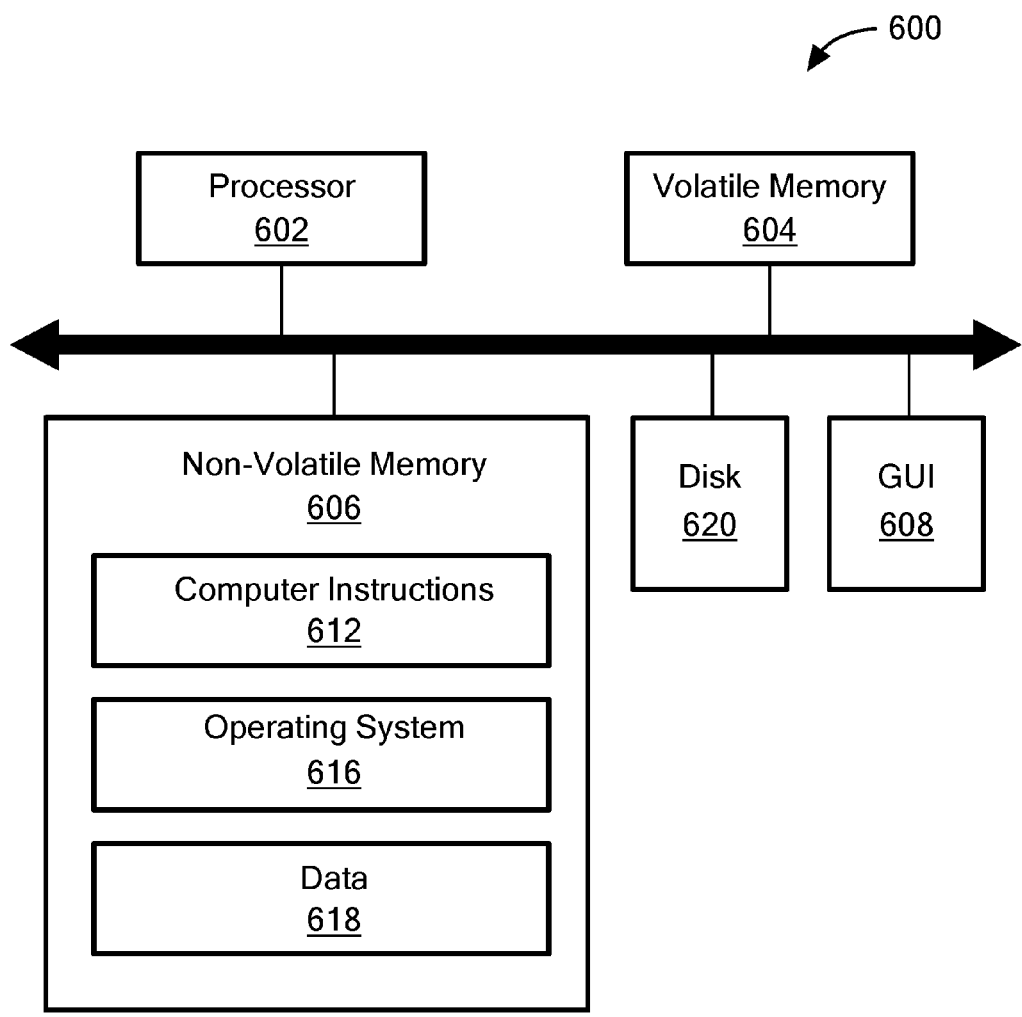
FIG. 6 is a block diagram of an embodiment of a computer system.

Referring now to FIG. 6, a computer 600 includes a processor 602, a volatile memory 604, a non-volatile memory 606 (e.g., hard disk), a graphical user interface (GUI) 608 (e.g., a mouse, a keyboard, a display, for example) and a computer disk 620. The non-volatile memory 606 stores computer instructions 612, an operating system 616 and data 618. In an embodiment, the data 618 may correspond to FJB-PD waveforms and pulse returns, as well as FJB waveforms and pulse returns. In some embodiments, non-volatile memory 606 includes a look-up table that stores and organizes data corresponding to the FJB-PD waveforms and pulse returns, as well as FJB waveforms and pulse returns. In one example, the computer instructions 612 are executed by the processor 602 out of volatile memory 604 to perform all or part of the method (or process) 400 of FIG. 4 and method (or process) 500 of FIG. 5.

In an embodiment, computer 600 may be the same as or substantially similar to each of the pre-screen module 110, RTAD module 120 and post-screen module 130 of FIG. 1 and the carrier phase monitor system 304 of FIG. 3. Computer 600 may perform all of the same functions and be configured to receive and generate the same data as each of each of the pre-screen module 110, RTAD module 120 and post-screen module 130 of FIG. 1 and the carrier phase monitor system 304 of FIG. 3, as described herein. For example, computer 600 may be configured to perform real time carrier phase monitoring on a moving platform and determine platform attitude and monitor carrier phases in a single step and use data screening, error bounds inflation and statistical tests to ensure both inputs and outputs of an attitude solution are self-consistent.

Methods 400 and 500 are not limited to use with the hardware and software of FIG. 6; they may find applicability in any computing or processing environment and with any type of machine or set of machines that is capable of running a computer program. Methods 400 and 500 may be implemented in hardware, software, or a combination of the two. Methods 400 and 500 may be implemented in computer programs executed on programmable computers/machines that each includes a processor, a storage medium or other article of manufacture that is readable by the processor (including volatile and non-volatile memory and/or storage elements), at least one input device, and one or more output devices. Program code may be applied to data entered using an input device to perform methods 400 and 500 and to generate output information.

The system may be implemented, at least in part, via a computer program product, (e.g., in a machine-readable storage device), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment.

A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer to perform methods 400 and 500. Methods 400 and 500 may also be implemented as a machine-readable storage medium, configured with a computer program, where upon execution, instructions in the computer program cause the computer to operate in accordance with methods 400 and 500.

Methods 400 and 500 may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

A number of embodiments of the disclosure have been described. Nevertheless, it will be understood that various modifications may be made without departing from the spirit and scope of the disclosure. Elements of different embodiments described herein may be combined to form other embodiments not specifically set forth above. Other embodiments not specifically described herein are also within the scope of the following claims.

What is claimed:

1. A method comprising:
  receiving data from a plurality of receivers on a platform, wherein the data corresponds to one or more satellite-receiver tracks, each of the one or more satellite-receiver tracks having an error bound;
  generating an attitude correction for the platform based on the received data;
  determining a convergence test statistic of the attitude correction;
  determining a convergence level of the attitude correction using the convergence test statistic; and
  responsive to the determination, monitoring a carrier phase error of signals received from the one or more satellite-receiver tracks, wherein monitoring the carrier phase error comprises:
    determining excluded satellite-receiver tracks having a carrier phase error greater than or equal to a carrier phase error threshold;
    monitoring the satellite-receiver tracks based on convergence level of the excluded satellite-receiver tracks and using the error bounds of the excluded satellite-receiver tracks when generating the attitude correction.

2. The method of claim 1, further comprising:
  identifying half cycle tracks in the one or more satellite-receiver tracks using double difference measurements; and
  screening out the identified half cycle tracks from the one or more satellite-receiver tracks from use in subsequent real time attitude determination (RTAD) attitude calculations.

3. The method of claim 1, further comprising decomposing double difference measurements to identify the satellite-receiver tracks with the carrier phase error greater than or equal to the carrier phase error threshold.

4. The method of claim 1, further comprising performing real-time attitude determination (RTAD) on the received data from the one or more satellite-receiver tracks having the carrier phase error less than the carrier phase threshold.

5. The method of claim 1, further comprising:
  determining a first convergence state under the attitude correction through threshold testing using the convergence test statistic;
  determining a second convergence state under the attitude correction; and
  enabling carrier phase monitoring responsive to achieving both of the first and second convergence states.

6. The method of claim 5, wherein the platform is a moving platform and further comprising achieving both of the first and second convergence states.

7. A method comprising:
  receiving data from a plurality of receivers on a platform, wherein the data corresponds to one or more satellite-receiver tracks;
  determining a carrier phase error level for each of the satellite-receiver tracks;
  identifying the satellite-receiver tracks having the carrier phase error level greater than or equal to a carrier phase error threshold;
  generating an attitude correction for the platform using the received data from the one or more satellite-receiver tracks having the carrier phase error level less than the carrier phase error threshold;
  determining a convergence state of the attitude correction; and
  updating carrier phase error level bounds for the one or more satellite-receiver tracks based on attitude observable residuals.

8. The method of claim 7, further comprising generating single difference measurements, double difference measurements and carrier phase measurements for the one or more satellite-receiver tracks.

9. The method of claim 7, further comprising generating the attitude correction for the platform using single and double difference measurements formed by the carrier phase measurements corresponding the one or more satellite-receiver tracks having the carrier phase error less than the carrier phase error threshold.

10. The method of claim 9, wherein the attitude correction is computed with Real Time Attitude Determination (RTAD).

11. The method of claim 10, further comprising:
  identifying half cycle tracks in the one or more satellite-receiver tracks using double difference measurements; and screening out the identified half cycle tracks from the one or more satellite-receiver tracks from use in subsequent RTAD attitude calculations.

12. The method of claim 7, further comprising decomposing double difference residual errors into carrier phase error estimates for the satellite-receiver tracks to identify any of the one or more satellite-receiver tracks with the carrier phase error greater than or equal to the carrier phase error threshold.

13. The method of claim 7, further comprising updating the carrier phase error bounds using a history of carrier phase error estimates for the satellite-receiver tracks.

14. A system comprising:
a pre-screen module configured to receive data from a plurality of receivers on a moving platform, wherein the data corresponds to one or more satellite-receiver tracks, each of the one or more satellite-receiver tracks having an error bound obtained over a period of time or at initialization;
a real time attitude determination (RTAD) module coupled to the pre-screen module, the RTAD module configured to generate an attitude correction based on attitude observables formed by the received data and attitude observable error bounds corresponding to error bounds for the one or more satellite-receiver tracks and calculate attitude observables residuals using the attitude correction; and
a post-screen module coupled to the RTAD module and the pre-screen module, wherein the post-screen module is configured to test a consistency between the error bounds for the one or more satellite-receiver tracks and the attitude observables residuals and responsive to the testing, update the error bounds for the one or more satellite-receiver tracks based on the attitude observable residuals.

15. The system of claim 14, further comprising:
a half cycle screening module coupled to the pre-screen module, wherein the half cycle screening module is configured to identify half cycle tracks in the one or more satellite-receiver tracks using double difference measurements; and
a screening module coupled to the pre-screen module and the half cycle screening module, the screening module configured to screen out the identified half cycle tracks from the one or more satellite-receiver tracks from use in subsequent RTAD attitude calculations.

16. The system of claim 14, wherein the pre-screen module is configured to re-test previously excluded satellite-receiver tracks after the updated error bounds for a respective satellite-receiver track is less than a carrier phase error threshold.

17. The system of claim 14, further comprising a decomposition module coupled to the pre-screen module, wherein the decomposition module is configured to decompose double difference residual errors into carrier phase error estimates for the one or more satellite-receiver tracks to identify tracks with a carrier phase error greater than or equal to a carrier phase error threshold.

18. The system of claim 14, wherein the RTAD module is configured to perform RTAD on the received data from the one or more satellite-receiver tracks having a carrier phase error less than a carrier phase threshold.

19. The system of claim 14, further comprising a residual module coupled to the post-screen module, the residual module configured to determine a first convergence state of the attitude correction through threshold testing using a convergence test statistic and determine a second convergence state of the attitude correction; wherein the post-screen module is configured to enable carrier phase monitoring responsive to achieving both of the first and second convergence states.

20. The system of claim 14, further comprising a convergence state module coupled to the post-screen module, wherein the convergence state module is configured to update carrier phase error bounds using a history of carrier phase error levels for the one or more satellite-receiver tracks.

* * * * *